United States Patent [19]
Effenberger

[11] Patent Number: 5,501,591
[45] Date of Patent: Mar. 26, 1996

[54] BLOW-MOULDING MACHINE WITH CALIBRATION STATIONS

[75] Inventor: Alfred Effenberger, Filderstadt, Germany

[73] Assignee: R. Stahl Blasformtechnik GmbH, Leinfelden-Echterdingen, Germany

[21] Appl. No.: 98,261

[22] PCT Filed: Jan. 22, 1992

[86] PCT No.: PCT/EP92/00124

§ 371 Date: Sep. 29, 1993

§ 102(e) Date: Sep. 29, 1993

[87] PCT Pub. No.: WO92/13703

PCT Pub. Date: Aug. 20, 1992

[30] Foreign Application Priority Data

Feb. 5, 1991 [DE] Germany ............ 41 03 416.3

[51] Int. Cl.$^6$ .................................................. B29C 49/06
[52] U.S. Cl. ........................ 425/529; 425/534; 425/538
[58] Field of Search .................... 425/527, 529, 425/534, 538

[56] References Cited

U.S. PATENT DOCUMENTS

| | | | |
|---|---|---|---|
| 3,480,994 | 12/1969 | Moslo | 425/538 |
| 3,767,342 | 10/1973 | Potter et al. | 425/157 |
| 3,794,454 | 2/1974 | Higginbotham et al. | 425/387 B |
| 4,124,668 | 11/1978 | Frohn | 264/40.1 |
| 4,290,995 | 9/1981 | Oas | 264/532 |
| 4,459,095 | 7/1984 | Rohr et al. | 425/527 |
| 4,552,526 | 11/1985 | Hafele | 425/534 |

FOREIGN PATENT DOCUMENTS

| | | |
|---|---|---|
| 3727990 | 3/1989 | Germany . |
| 3925859 | 4/1989 | Germany . |
| 1172827 | 12/1969 | United Kingdom . |

*Primary Examiner*—Tim Heitbrink
*Attorney, Agent, or Firm*—Antonelli, Terry, Stout & Kraus

[57] ABSTRACT

A blow molding machine comprising two calibration stations and an extruder arranged between the two calibration stations. The machine produces hose-shaped parisons to be blown into hollow bodies by mold forms in an alternating sequence and in a periodical sequence at the respective calibration stations. An extruder is located along a vertically extending longitudinal center plane of the blow molding machine along which the mold forms are displaceable back and forth between the associated calibration stations and the extruder. A transport device transports the respective hollow bodies blown at the calibration stations to at least one post processing station in sequence. A transport mask is displaceable back and forth along a transport path disposed at a lateral distance from the longitudinal center plane of the blow molding machine and parallel thereto.

13 Claims, 3 Drawing Sheets

BLOW-MOULDING MACHINE WITH CALIBRATION STATIONS

FIELD OF THE INVENTION

The present invention relates to blow molding machine which includes two calibration stations with an extruder arranged therebetween for producing hose-shaped parisons in an alternating sequence and in a periodical sequence at calibration stations, with produced hollow bodies being transported to at least one further processing or work station for processing and with a discharge for the processed hollow bodies.

BACKGROUND OF THE INVENTION

In, for example, DE-3925859-A1, a blow molding machine is proposed which comprises two calibration stations and an extruder arranged therebetween, with the extruder being adapted to produce hose-shaped parisons adapted to be taken up by mold forms in an alternating sequence in the mold forms and in a periodical sequence at the calibration stations. The calibration stations and the extruder are arranged along a vertical longitudinal center plane along which the mold forms, representing the objects to be loaded with the plastic parisons, are displaceable back and forth between their associated calibration stations and the extruder. At least one post-processing station at which the blow hollow bodies are subjected to a post-processing is provided, and a transport device transports the hollow bodies blown at the calibration stations to the post-processing station in sequence as timed by the blow cycles. The transport device is constructed as a transport-mask which is alternatingly moveable into acceptance position for accepting the molded hollow bodies and, from these acceptance positions, are transportable to the post-processing station. The transport mask is constructed in the manner of a blow mold half as a half mask having at least one hollow body acceptance aperture or opening within which a hollow molded body introduced therein is vertically supported and secured to prevent falling out from the transport mask by fully formed engagement of the contour of the aperture or opening with protrusions of form reductions of the hollow molded body.

In a blow molding machine of the aforementioned type, in order to be capable of delivering hollow molded bodies blown at the two calibration stations to any post-processing stations subsequently arranged along a transport plane, a swinging gripper is provided which, in periodical sequence, pivots from one calibration station to the first post-processing station, from the first post-processing station to the other calibration station and again back to the first post-processing station, etc. thereby, in each case, delivering the hollow blow bodies to the post-processing station from which further transport of the post process hollow blown bodies occurs along a transport plane which is extended at right angles to the vertical central plane of the basic machine defined by the arrangement of the calibration stations and the extruder.

SUMMARY OF THE INVENTION

The aim underlying the present invention resides in providing a blow molding machine of the aforementioned type which avoids inherent disadvantages to the conventional blow molding machine which requires each of the two calibration stations to include an individual set of post-processing stations.

By virtue of the features of the present invention, a noticeable improvement over the conventional blow molding machines is achieved since complicated transport devices for bringing the hollow blown bodies produced at the two calibration stations are eliminated and it is only necessary to provide one set of post-processing stations. Consequently, space requirements for accommodating the individual sets of post-processing stations is reduced. Moreover, the necessary technical efforts to realize the machine are reduced. In this connection, conventional blow molding machines of the type described above employing the swing gripper requires a considerable technical effort, and, in view of the arrangement of the post-processing stations and of the swinging gripper with respect to one another, time consuming adjustments are required which also complicate a set up of the machine. The features of the present invention not only simplify a conventional machine but also improve adjustability of the machine without influencing otherwise favorable functional properties.

In accordance with the present invention, in a blow molding machine of the type described hereinabove, the transport device is constructed as a transport-mask which is displaceable back and forth along a transport plane extending at a lateral distance from the longitudinal center plane of the blow molding machine and parallel thereto. The transport-mask is alternatingly moveable between the respective calibration stations so that the transport-mask is moveable into acceptance positions opposite from the respective calibration stations and, starting from the acceptance positions, the transport-mask is transportable to at least one post-processing station which, as viewed in a direction of transport, is disposed following one of the calibration stations and in a vicinity thereto. The transport-mask is constructed as a blow mold half or a half mask having at least one acceptance aperture which is oriented or disposed toward the respective calibration station. The acceptance aperture or opening is adapted to accommodate a hollow molded body introduced therein and to be vertically supported and secured to prevent falling out from the transport-mask by a fully formed engagement of the contour of the aperture or openings with protrusions or reductions of the hollow molded body. In order to enable a transferring of the hollow molded bodies blown at the respective calibration stations and to enable an upward and downward displacement of the blow mandrels, the half masks are constructed so as to be moveable in a direction at right angles to the longitudinal center plane of the blow molding machine.

By virtue of the noted features of the present invention, the transport-mask may be transported at least to the first post-processing station and is displaceable back and forth between the acceptance positions opposite to the calibration stations along the transport plane extending at a lateral distance from the longitudinal center plane of the blow molding machine.

At least one post-processing station and, if provided, other post-processing stations are arranged subsequently to one of the calibration stations in a vicinity thereto with the result being that further transport occurs in the same direction as the displacement of the blow mold forms to which the blow mold forms are subjected between the calibration stations and the extruder. Thus, the blow molding machine of the present invention is linear in construction.

Furthermore, the calibrations stations accommodating the upward and downward displacement of the blow mandrels blown at the respective calibration stations delivered to the transport-mask are constructed so as to be moveable at right angles to the longitudinal center plane of the blow molding machine.

With a blow molding machine according to the present invention, for delivering the hollow blown bodies to the transport-mask and to transport the bodies to one or more post-processing stations, only linear drives are required which are simple in construction and are realizable at a low cost. Moreover, the swinging gripper having a high moment of inertia is eliminated. Additionally, the rotational drive for the transport-mask as proposed in a conventional blow machine as described above is required at least when asymmetric is required at least when asymmetric hollow blown bodies produced at the calibration station with the same orientation along the longitudinal center plane of the base machine should also be conveyable to the post-processing station in a defined orientation. Instead of rotational drives, the blow molding machine according to the invention utilizes linear drives by which heads of the calibration stations, carrying the blow mandrels, can be displaced back and forth at right angles to the longitudinal center plane of the blow molding machine.

The linear drives of the present invention are realizable with a comparatively technical effort since they are, as noted above, simple in construction and can be constructed only for relatively small working strokes. The hollow blown bodies in the course of transport by the transport mask arrangement of the present invention are merely subjected transulatory motions but not subject to rotary movements which could subject the hollow bodies to centrifical forces. Thus, with the present invention, it is possible to construct the transport-mask merely as a "half mask" which implies additional simplification as compared with the transport-mask as required in the blow molding machine described hereinabove. Where, due to the rotary transport movements, the transport mask must have two half masks displaceable with respect to one another in analogy to form halfs of the blow mold.

In accordance with further features of the present invention of the one or more post-processing stations in the blow molding machine arrangement are arranged along a transport plane. By arranging the post-processing stations along the transport plane, the transport mask of the blow molding machine of the blow molding machine of the invention may also be used for further conveyance of the hollow blown bodies at least insofar as the dwell times of the hollow blown bodies at the respective post-processing stations are very short.

In accordance with still further advantageous features of the present invention, the first processing station may include at least one of a stamping station or a station for removing a bulb from the blown hollow molded bodies. Such post-processing station is of the type wherein post-processing the carried out in only a few tenths of seconds.

It is further advantageous in accordance with the present invention if the transport-mask is used as a abutment member by which, during the stamping process, the hollow molded bodies subjected to the stamping process is held in position.

In conjunction with the last mentioned features of the present invention, the transport-mask can also be used for subsequent transport to the next post-processing or inspection station provided it is not necessary to use the transport mask at the next post-processing or inspection station for a longer time interval as the abutment or holding element.

In accordance with the present invention, the acceptance aperture or opening to the calibration stations have a generally u-shaped form, with borders of the acceptance aperture or openings having a contour which is complimentary to the outer contour of the hollow molded bodies to be accepted. An inner curved border portion of the acceptance apertures or openings are provided with leg portions which extend in parallel with respect to each other and at right angles with respect to the central longitudinal plane. A drive device is provided for retracting the transport-mask from its position of engagement with the transported hollow molded bodies, with the transport mask being displaceable at right angles with respect to the transport plane.

By virtue of the last noted features of the present invention, a simple functionable favorable construction of the acceptance aperture or openings of the transport-mask is defined which insures a certain transport of the hollow bodies blown at the respective calibration stations to the post-processing stations. A short stroke linear drive is required to disengage the transport-mask from its engagement position with the hollow blown bodies.

Advantageously, the drive unit for the lateral movement of the transport-mask is a double acting pneumatic cylinder following the longitudinal movement of the transport-mask.

In accordance with the present invention, the drive unit provides for displacement of the transport-masks at right angles with respect to the transport plane and is mounted on a guide block which, as viewed in the direction of transport, that is parallel to the transport plane, is displaceably guided at the machine bed whereby the transport-mask is carried displaceably guided at right angles with respect to the transport plane.

With the features of the present invention, the short stroke linear drive is mounted on a guide block which is displaceable in the longitudinal direction of the blow molding machine with the guide element being fixedly or solidly connected with the machine bed.

For this purpose, according to the present invention, a guide tube is provided which is fixed to the machine bed by a prismatic guide body and forming the guide elements solid with the machine bed for the guide block slideably displaceably arranged thereon. The guide block is provided with a longitudinal slot, with longitudinal faces of the slot being supported against the opposing free longitudinal guide surfaces of the prismatic bodies.

Advantageously, according to the present invention, the transport-mask is displaceable along the longitudinal center plane of the blow molding machine by a toothed belt drive having electric drive motor with a reversible drive direction. At least one run of the toothed belt drive is fixed to the guide block and carries the transport-mask and extends in parallel to the guide tube.

A particular space saving advantageous construction of the toothed belt drive may be achieved in accordance with the present invention with the plane which is defined by the course of the toothed belt extends in parallel to the longitudinal center plane of the blow molding machine, with the upper run of the toothed belt extending through a guide tube, and with the guide block being connected to the lower run of the toothed belt by a clamping element so as to form a belt joint.

According to the present invention, the acceptance apertures or openings of the transport-mask are provided with a vacuum channel which is connected to a vacuum source communicating with the respective apertures or openings within a range of the aperture border surrounding the accepted hollow molded body and adapting thereto. By virtue of these features, a particular certain fixation of the hollow blown bodies in the acceptance apertures or openings of the transport-mask during transport is obtained.

BRIEF DESCRIPTION OF THE DRAWINGS

Further details and features of the invention will become more apparent in the following description when taken in connection with the accompanying drawings which show, for the purposes of illustration only, one embodiment in accordance with the present invention, and wherein.

DESCRIPTION

Figure 1:
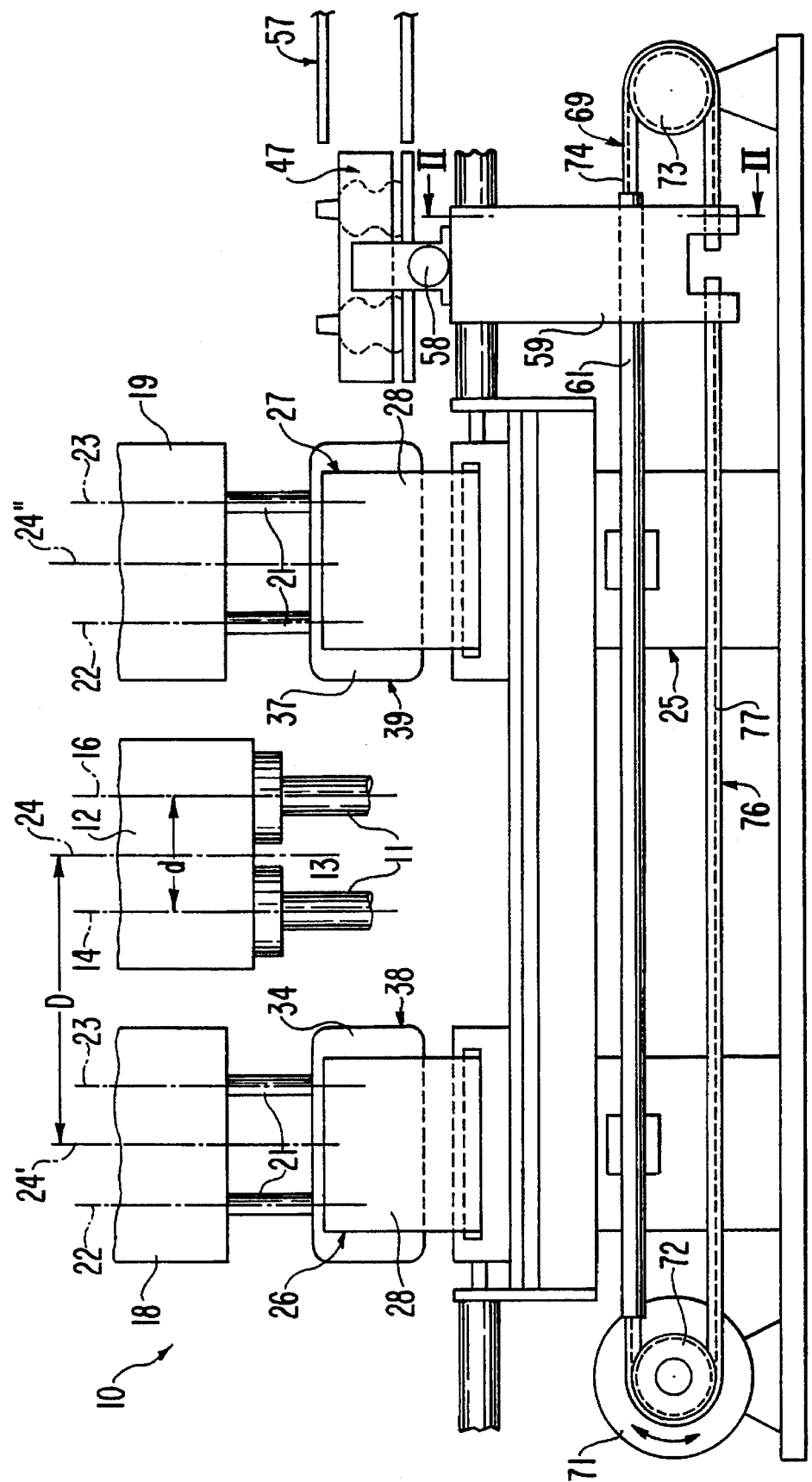
FIG. 1 is a schematic view of a blow molding machine according to the invention with a transport-mask displaceable in parallel to a vertical longitudinal center plane of the blow molding machine.

Referring now to the drawings for in like reference numerals are used through out the various views to designate like parts and, more particularly, to FIG. 1 according to this figure a blow mold machine generally designated by the reference numeral 10 is adapted to manufacture bottle shaped cans or tube shaped hollow bodies, or canisters consisting of common thermal plastic materials suitable thereto such as polyethylene (PE), polypropylene (PP), polyvinylchloride (PVC), polystyrene (PS) or polyamide (PA)_ which represent samples of commonly used materials suited for a blow-molding process.

The plastic material to be transformed into a finished produce is supplied to the blow mold machine 10 in a thermally-plasticized condition, in the form of a hose-like parison or blank 11, from an extruder generally designated by the reference numeral 12 which, in the illustrated embodiment has two extrusion heads 13 from which the parisons or blanks 11 emerge suspended in a downward direction and in coaxial arrangement relative to the central axes 14, 16 of the respective extrusion heads 13.

Viewed along the vertical extending longitudinal center plane 17 (FIG. 3), defined by the two central axes 14 and 16 of the respective extrusion heads 13 of the extruder 12, calibrating stations 18, 19 are arranged on both sides of the extruder 12. Each of the calibrating stations are provided with two blow mandrels 21 whose vertical axes 22, 23 also extend along the center plane 17 of the extruder 12 or of the blow molding machine 10. In the horizontal direction, longitudinal to the center plane 17 of the blow forming machine 10, the blow mandrels 21 each form one of the calibration stations 18, 19 and have an identical spacing d with respect to each other as the central axes 14, 16 of the extrusion heads 13. The extruder 12 has an identical spacing D to the respective calibration stations 18, 19 as measured along the center plane 17 between a right angle to the transverse plane 24 of the extruders 12 and parallel thereto, centrally between the center blow mandrel axes 22, 23 transverse plane 24' 24" of the respective calibration stations 18, 19.

The extruder 12 and the two calibration stations 18, 19, schematically illustrated as machine beds designated by the reference numeral 25, also form a support for two closing systems generally designated by the reference numerals 26, 27. The respective closing systems 26, 27 are arranged on the respective machine beds 25 and in the direction of the center plane 17 and are able to move horizontally back and forth. The calibration stations 18, 19 are at right angles to the center plane 17 of the blow forming machine 10 and are arranged so that they can move back and forth, with the extruder 12 being fixedly mounted on the main frame (not shown).

Figure 3:
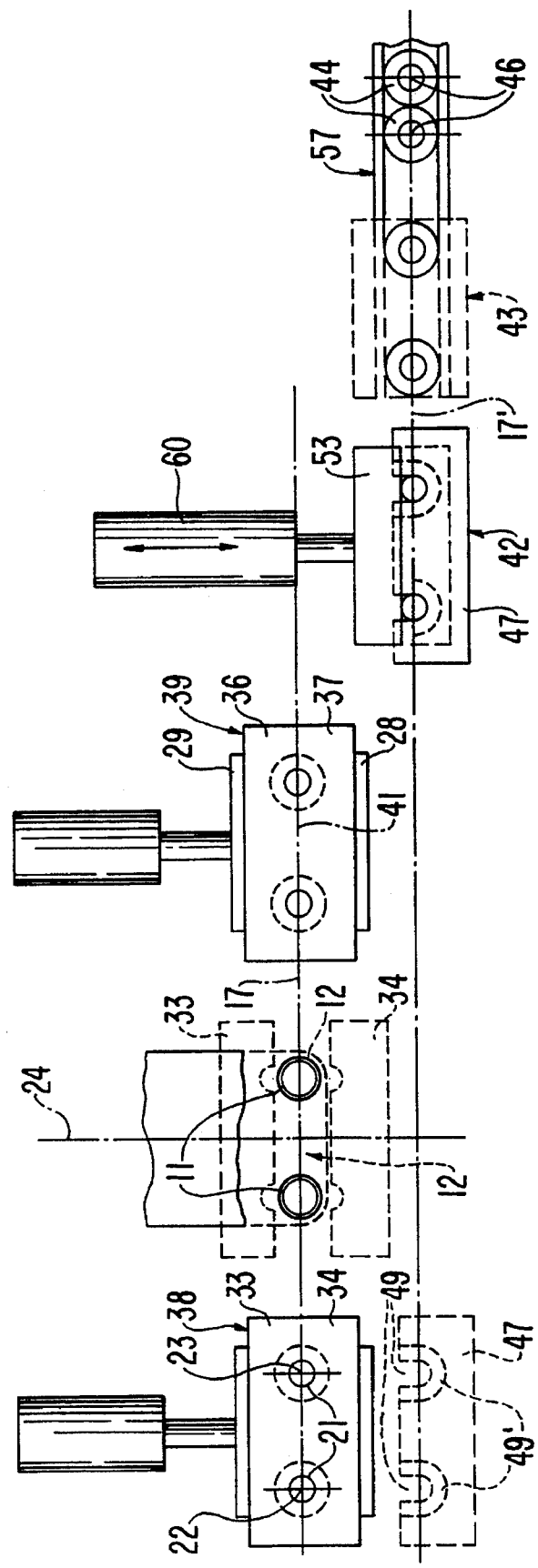
FIG. 3 is a schematic plan view of the blow molding machine of FIG. 1 for explaining its function.

In FIG. 3, the calibration stations 18, 19 are represented only for the sake of clarity by schematic sections of their blow mandrels 21. The blow mandrels 21 include central axes 22, 23 and are illustrated as an explanation for the construction and function of the blow forming machine 10 in the same manner as the extruder 12 due to the cross section of the plastic parisons or blanks 11.

Each of the two closing systems 26, 27 comprises two closing jaws or platens 28, 29. The closing jaws 28, 29, at opposing sides, form blow form halfs 33, 34 and 36, 37 respectively of two mold forms generally designated by the reference numerals 38, 39 respectively. Hollow bodies to be produced at the calibration stations 18 or 19 are blown in the mold forms.

The respective closing systems 26, 27 are mounted on slide blocks (not shown) in a conventional manner. The slide blocks are arranged on a guiding device on the machine bed parallel to the center plane 17 of the blow forming machine and are able to move back and forth in order to enable plastic parisons or blanks 11 to be removed from the extruder 12 and transported to the respective calibration stations 18 or 19 where the hollow bodies 44 are blown. The particular motions of the mold forms 38, 39 as well as the closing system 26, 27 are controlled by a hydraulic drive cylinder. In this manner, the control for the opening of closing motions of the mold forms 38, 39, such as a hydro-cylinder constructed as a linear cylinder, actuates a mechanical engagement between the clamping jaws 28, 29 and the closing system 26 or 27.

The relative motions achieved with the hydro-cylinders for the closing jaws 28, 29 of the closing system 26, 27 are "symmetrisised" through gearing elements such as, for example, a rack and pinion (not shown) so that the blow form halves 33, 34 or 36, 37, respectively, for the mold forms 38, 39, having a closing gap 41 in the closed state of the mold forms 38, 39, extend in the center plane 17 of the blow formed machine 10, were the same engagement and disengagement relative to the center plane 17 is the same in an opening direction as in the closing direction.

The blow form machine also comprises a plurality of post working or processing stations such as, for example, a bulb removal station generally designated by the reference numeral 42 or a stamping station as well as a subsequent station such as a test station generally designated by the reference numeral 43. Further post working or processing stations could follow with the additional or further post working or processing stations being arranged along a parallel to the center plane 17, namely, in a secondary or transport plane 17' along which plane 17' the transport of the hollow bodies 44 is effected until the hollow bodies arrive at a discharge station (not shown).

Figure 4:
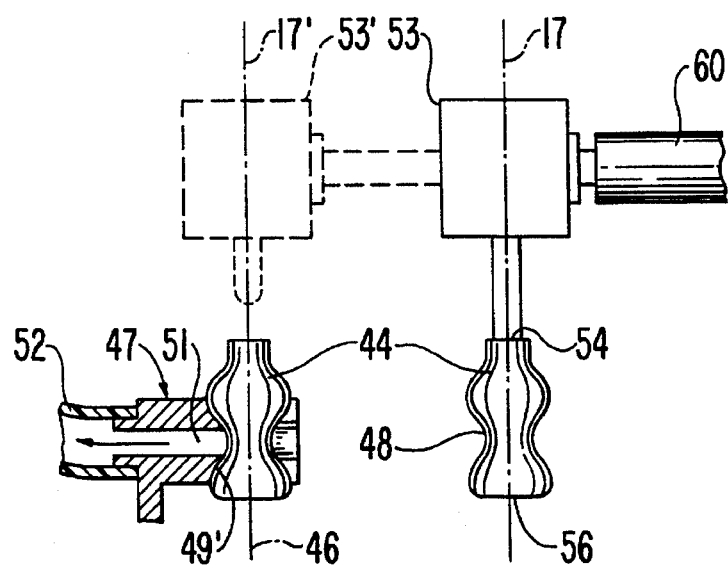
FIG. 4 is a partial cross-sectional view of the blow molding machine of FIGS. 1 and 3 as viewed in a direction of the vertical longitudinal center plane.

The calibration stations 18, 19, schematically illustrated in FIG. 3, are more clearly shown in FIG. 4, viewed at right angles to the center plane 17 of the blow form machine. The calibration stations 18, 19 are able to move back and forth in such a manner that the hollow bodies 34 can be brought into the transport plane 17' for example, moved a distance such that the central axes 46 of the hollow bodies 44 extend into the transport plane 17'. A moveable transport-mask 47 is arranged along the transport plane 17'. The moveable transport mask 47 enables the blown hollow bodies 44 to at least be brought from the calibrating stations 18, 19 to a following arranged post working or processing station such as, for example, the stamping station 42.

The transport-mask 47 is loaded or driven by the hydraulic controlled displacement of the respective calibration stations 18 or 19, with the loading being effected after the mold form 38 or 39, in which the hollow molded bodies 44, which are to be subjected to further processing are completely blown, is just opened and is transferred below the extruder 12 for further acceptance of blowable materials. The transport mask is designed as a "half mask" which, within a medium portion of its height, is geometrically similar to a medium portion of the respective blow mold half 34 or 37 of the blow mold forms 38, 39, respectively, and which is, as shown, for example, in detail in FIG. 4 continuously joining to form a reduction of the hollow molded body 44, for example, a bottle. The half mask surrounds the hollow molded body 44 over 180° of a circumferential portion thereof and is open to the calibration stations 18 or 19, respectively. The half mask has a substantially u-shaped form such that lateral straight line portions of the substantially u-shaped acceptance apertures 49 (FIG. 3) rectangularly extending to the transport plane 17, a tangential continuation of a curved or bent portion 49' (FIG. 4) of the acceptance apertures or openings 49.

By the above noted measured the respective hollow molded bodies 44 contained in the transport-mask 47 remains secured therein, even if the respective hollow bodies 44 are subjected to a small lateral displacement which is directed rectangularly to the transport planes 17 due to, for example, a vibrational force.

In order to retain the hollow bodies 44 securely in the transport-mask 47, as shown in FIG. 4, the unit is provided with a vacuum channel 51 that is connected with a flexible tube 52 to a suction side of a pump (not shown) and adjoins in a central area of the curved or bent portion 39' in the respective acceptance aperture or opening 49 of the transport-mask 47. In this manner, the hollow body 44 can be securely held in the system in the curved or bent portions 49' of the acceptance apertures or openings 49 in the transport-mask 47 while be displaced in the transport direction.

The transport mask 47 is used as a back stop for a stamping tool 53 (FIG. 3) at the stamping station 42 where the plastic exits at the top of the neck 54 of the bottle as well as on the bottom 56 (FIG. 4) can be cut off or stamped off by the stamping tool 53 by a pneumatic cylinder 60 (FIG. 3) disposed at right angles to the transport plane 17' thereby enabling the stamping tool 53 to move in the direction of the double-headed arrow in FIG. 3.

The transport mask 47 may also be used for the further transport to the stamping station 42 for the bulb removal on the hollow body 44 and to a subsequent test station that can, for example, also be used for testing the air tightness or the like of the hollow body 44. The further transport of the already post worked or processed and tested hollow bodies 44 can be effected along a guide rail generally designated by the reference numeral 57 in a conventional manner.

Figure 2:
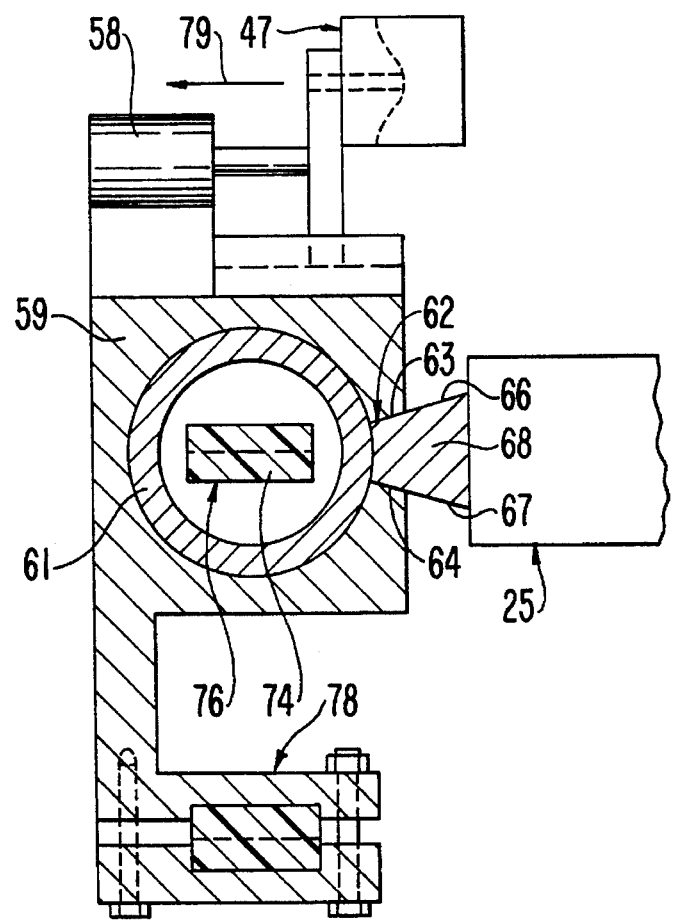
FIG. 2 is a partial cross-sectional view of the transport-mask of FIG. 1 and guide elements required for longitudinal guidance taken along the line II—II in FIG. 1.

In order to disengage the transport-mask 47 from the post working or processing stations 42, 43 as well as to bring the hollow body 44 from the guide rail 57 to the transport plane 17', the transport-mask 47 is provided with a pneumatic drive cylinder 59 (FIG. 2) transverse to the transport plane 17' as viewed from the center plane 17 of the blow form machine 10, and provides a drive for the transport-mask 47.

The transport-mask 47 and the pneumatic drive cylinder 58, mounted at right angles to the center plane 17 for transferring the hollow bodies 44, is mounted on a guide block 59. The guide block 59 extends parallel to the transport plane 17', horizontally, and is firmly fixed to the machine bed on an attached pipe 61. The guide block 59 is moveable in a fully guided motion by a guide slot 62 provided on a side of the guide block 50 directly across from the machine bed at 25. The guide slot 62 includes longitudinally extending cheeks 63, 64 which are in continuous contact with respective side longitudinal surfaces 66, 67, and in permanent contact with a prismatic guide body 68 permanently fixed to the machine bed 25 which is further connected to the guide pipe 61. Due to the positive locking action of the longitudinal faces 63, 64 on the respective guide surfaces 66, 67 of the prismatic guide body 68, the rotary displacement of the transport mask 47 is prevented. As a longitudinal drive for the transport mask 47 along the transport plane 17' and which can be moved back and forth, a toothed belt drive 69 driven, for example, by an electric motor 61 and a positively locked motor shaft drive pinion 72 and a displacement wheel 73 may be provided as shown in FIG. 1. The toothed belt drive is arranged outside of an area of motion of the transport mask 47. An upper run 64 of the toothed belt 76 of the toothed belt drive 69 is guided over a length thereof through a guide tube 61. The lower run 77 of the toothed belt 76 is positively connected to the guide block 59 by, a shown in FIG. 2, L-shaped clamping element 78 forming a toothed belt joint.

In the positions of the blow mold forms 38, 39 and of the transport mask 47 as illustrated in full lines in FIG. 3, both calibration stations 18, 19 have hollow bodies blown therein, whereas at the stamping station 42, the hollow blown bodies 44 which had previously been blown at the "right" calibration station 19, as viewed in FIGS. 1 and 3, are subjected to the bulb removal stamping process.

After a termination of the stamping process which requires only a few tenths of seconds and, if it should happen, transportation of the "bulb removal" hollow blown bodies 44 into the inspection station 43 following the stamping station 42, the transport mask 47 is removed from an engaging position with the hollow blown bodies 44 transported in the described manner in the direction of the arrow 79 (FIG. 2) by a pressure supply to the pneumatic cylinder 58 (FIG. 2) and is, by reverse control of the electric motor 71, brought into a functional position opposite to the left hand calibration station 18 which is represented in FIG. 3 by dashed line by the toothed belt drive. Upon moving the transport-mask in the direction of the initial functional position, the pneumatic drive cylinder 58 is supplied with pressure in such a manner that the transport mask 47 again is brought into an acceptance position nearer to the calibration station 18 in which it is adapted to accept the hollow blown body 44 blown at the calibration station 18 in a position of the blown hollow bodies in which the central axes 46 of the hollow blown bodies 44 coincide with the center plane 17 of the blow mold machine 10.

As soon as the blowing process at the calibration station 18 which is more advanced than the blowing process still occurring at the other calibration station 19 is terminated, the blow mold 38 arranged at the calibration station 18 opens and travels in its open state into a position below the extruder 12 which is shown in dashed lines in order to accept the hose-shaped plastic parisons or blanks 11 extruded there in the meantime to a sufficient extent. Simultaneously herewith the hollow blown bodies 44 still attached to the mandrels 21 at the calibration station 18, are transferred into the transport mask 47 by shifting the calibration station 18 towards the transport plane 17' and immediately thereafter the mandrels 21 of the calibration station 18 are elevated, with the hollow blown bodies 44 being transferred to the transport mask 47 and secured within the transport mask 47 by the vacuum acting on one side thereof.

Thereafter, the calibration station 18 is immediately returned back to its original position which is used for the blowing process and in which the central axes 22, 23 of the blowing mandrels 21 coincide with the center plane 17 of the blow molding machine 10.

Simultaneously, the transport mask 47, by activation of the toothed belt drive 69 in a forward direction, is transported into the position provided for the stamping of the hollow molded body 44 at the stamping station 42. During the transportation of the transport mask 47, the blow mold is closed, that is, the clamping jaws or patens are closed, below the extruder 12 and travels into its allocated position below the calibration station 18 suitable for the blow process where after, at this calibration station 18, the calibration and blowing process is immediately formed. After a short duration, stamping of the hollow blown bodies blown in advance at the left hand calibration station 18 and, if it is the case further transportation of the hollow blow bodies 44, to the test station 43 and the retraction of the transport mask 47 from its position of engagement with the finished hollow blown bodies 44, the transport mask 47 is now transported into its functional position opposite to the calibration station 19 on the right hand side, which is analogous to the functional position described above in connection with the calibration station 18.

In view of achieving the shortest possible cycle time for the blow molding machine 10 the functional position must be achieved at the latest when the calibration station 19 can be moved towards the transport mask 47 which is possible at the earliest moment when the mold form 39 associated with the calibration station 19 in the open state, has reached its acceptance position below the extruder 12. After loading or charging the transport mask 47 with the hollow blown body 44 previously blown at the calibration station 19, which occurs after loading analogous to the loading of the transport mask 47 at the other calibration station 18, the transport mask 47 now carries out its transportation stroke leading to the stamping station 42 where now again the stamping process is carried out and thereby the process cycle has now again reached a phase as occurring at the beginning of the explanation of the process cycle. In this manner by periodical repetition of the process cycles, an effective series production of hollow blown bodies 44 is possible which is realizable within the shortest cycle times due to the fact that the number of transportation cycles may simultaneously occur while the blowing process is undertaken at the respective calibration stations 18, 19.

In practice, the cycle sequential frequency is determined by the physical boundary conditions and therefrom resulting time intervals required for the extrusion of the hose-shaped parisons or blanks and for the unavoidable cooling at the calibration stations 18, 19. There are no time losses occurred by the transport procedure in any way.

I claim:

1. A blow molding machine comprising two calibration stations, an extruder arranged between said two calibration stations and producing hose-shaped parisons adapted to be blown into hollow bodies by mold forms in alternating sequence and in periodical sequence at the respective calibration stations, said calibration stations and extruder being arranged along a vertically extending longitudinal center plane of the blow molding machine along which the mold forms are displaceable back and forth between associated calibration stations and the extruder, a transport device adapted to transport the respective hollow bodies blown at the calibration stations to at least one post processing station in sequence as timed by blow cycles by the blowing molding machine, wherein the transport device is fashioned as a transport mask displaceable back and forth along a transport path, said transport path is disposed a lateral distance from the longitudinal center plane of the blow molding machine and parallel thereto, said transport mask is transported alternatingly between the respective calibration stations into an acceptance position opposite the respective calibration stations, wherein starting from the acceptance position at the respective calibration stations, the transport mask is transported to the at least one post processing station which, when viewed in a direction of transportation of the transport mask, said at least one post processing station is arranged following one of the calibration stations, wherein said transport mask is constructed as a blow mold half mask having at least one acceptance aperture opening in a direction of an associated calibration station for enabling an introduction of a hollow molded body from the calibration station, for vertically supporting and for securing the hollow body to the transport mask to prevent the hollow molded body from falling out of the transport mask during transport by fully formed engagement of a contour of the at least one acceptance aperture with one of protrusions and form reductions of the respective hollow molded bodies, and wherein each of said calibration stations include blow mandrels for blowing the hollow bodies in the mold forms, said calibration stations are constructed to be moveable in a direction at a right angle with respect to the longitudinal center plane of the blow molding machine.

2. A blow molding machine according to claim 1, wherein the at least one post processing station is arranged along the transport path.

3. A blow molding machine according to one of claims 1 or 2, wherein the at least one post processing station includes one of a stamping station and a station for removing a bulb of material from the respective hollow molded bodies.

4. A blow molding machine according to claim 3, wherein the at least one processing station includes one of a stamping station, a station for removing a bulb of material from the respective hollow molded bodies, and an inspection station for inspecting the process of hollow molded bodies.

5. A blow molding machine according to claim 3, wherein the at least one post processing station is a stamping station, and wherein the transport mask is used as an abutment member for holding the respective hollow molded bodies in position during a stamping process of the stamping station.

6. A blow molding machine according to claim 3, wherein a plurality of post processing stations are provided including the stamping station and the station for removing the bulb material located downstream of the stamping station, and wherein the transport mask is adapted to transport the respective hollow molded bodies from the stamping station to the station for removing the bulb material.

7. A blow molding machine according to one of claims 1 or 2 wherein the at least one acceptance aperture has a substantially u-shaped configuration complimentary to an outer contour of the respective hollow molded bodies, wherein inner curved border portions of the at least one acceptance aperture are fashioned as leg portions extending parallel with respect to each other and that a right angle with respect to the center longitudinal plane of the blow molding machine, a drive device is provided for retracting the transport mask from a position of engagement with the respective transported hollow molded bodies at the at least one processing station, and wherein said drive device is adapted to displace the transport mask at a right angle with respect to the transport path.

8. A blow molding machine according to claim 7, wherein the drive device includes a double acting pneumatic cylinder connected to the transport mask.

9. A blow molding machine according to claim 8, wherein the drive unit is mounted on a guide block which, as viewed in a direction parallel to the transport path is displaceably guided at a machine bed so as to enable the transport mask to be displaceably guided at the right angle with respect to the transport path.

10. A blow molding machine according to claim 9, wherein a guide tube is fixed to the machine bed, a prismatic guide body forming a guide element is fixed to the machine bed for accommodating the guide block slideably displaceable on said prismatic guide body, said guide block includes a longitudinal slot having longitudinally extending faces respectively supported against opposed free longitudinally extending guide surfaces of the prismatic guide body.

11. A blow molding machine according to claim 10, wherein a drive means is provided for moving the transport mask in a direction parallel to the transport path, said drive means includes a toothed belt driven by a reversible electric drive motor, said toothed belt including an upper run fixed to said guide block and carrying a transport mask, and wherein a said upper run extends in parallel to said guide tube.

12. A blow molding machine according to claim 11, wherein a plane defined by a course of the toothed belt extends parallel to the longitudinal center plane of the blow molding machine, the upper run of the toothed belt extends through the guide tube, and wherein the guide block is connected to a lower run of the toothed belt by a clamping element forming a belt joint.

13. A blow molding machine according to any one of claims 1 or 2, wherein the at least one acceptance aperture includes a vacuum channel connected to a vacuum source communicating with the at least one aperture in a vicinity of a border of at least one aperture.

* * * * *